United States Patent
Blacquiere et al.

(10) Patent No.: US 7,577,810 B2
(45) Date of Patent: Aug. 18, 2009

(54) DEVICE AND METHOD FOR RECORDING INFORMATION

(75) Inventors: Johannis Friso Rendert Blacquiere, Eindhoven (NL); Pope Ijtsma, Eindhoven (NL); Dirk Hamelinck, Eindhoven (NL)

(73) Assignee: Koninklijke Philips Electronics N.V., Eindhoven (NL)

(*) Notice: Subject to any disclaimer, the term of this patent is extended or adjusted under 35 U.S.C. 154(b) by 409 days.

(21) Appl. No.: 10/561,465

(22) PCT Filed: Jun. 17, 2004

(86) PCT No.: PCT/IB2004/050930

§ 371 (c)(1),
(2), (4) Date: Dec. 20, 2005

(87) PCT Pub. No.: WO2004/114306

PCT Pub. Date: Dec. 29, 2004

(65) Prior Publication Data

US 2007/0276605 A1    Nov. 29, 2007

(30) Foreign Application Priority Data

Jun. 23, 2003    (EP) ................................ 03101837

(51) Int. Cl.
G06F 12/00    (2006.01)
G06F 13/00    (2006.01)
G06F 13/28    (2006.01)

(52) U.S. Cl. .......................................... 711/165; 714/8
(58) Field of Classification Search ................ 711/165; 714/8

See application file for complete search history.

(56) References Cited

U.S. PATENT DOCUMENTS

| 5,956,309 | A | 9/1999 | Yamamuro |
| 6,279,118 | B1 | 8/2001 | Kang |
| 7,058,852 | B2* | 6/2006 | Sims et al. ..................... 714/8 |
| 2001/0047451 | A1* | 11/2001 | Noble et al. ................. 711/111 |

FOREIGN PATENT DOCUMENTS

| EP | 1120787 A1 | 8/2001 |
| JP | 2001057028 | 2/2001 |
| WO | 9816014 A1 | 4/1998 |

OTHER PUBLICATIONS

ECMA-267: 12- MM DVD-Read-Only Disk, ECMA Standardizing Information and Communication Systems, pp. 1-77, Dec. 1997.

* cited by examiner

Primary Examiner—Matt Kim
Assistant Examiner—Edward J Dudek

(57) ABSTRACT

A device for recording records a series of blocks (42) having continuous logical addresses, e.g. digitally encoded video, on a record carrier at a corresponding physical address range. Some physical addresses are assigned to defect management areas (43). The logical addresses are translated into the physical addresses in dependence of the defect management information. The device has contiguous recording means for detecting if the allocated physical address range is interrupted by a subset of physical addresses assigned to a defect management area. If so, the subset of physical addresses is reallocated to the user data area. The series of blocks (42) is contiguously recorded extending over the subset of physical addresses. The defect management area may be eliminated, shifted to a new location (51) after the end of the recorded file or shifted to the end of the medium.

10 Claims, 3 Drawing Sheets

Figure 3:
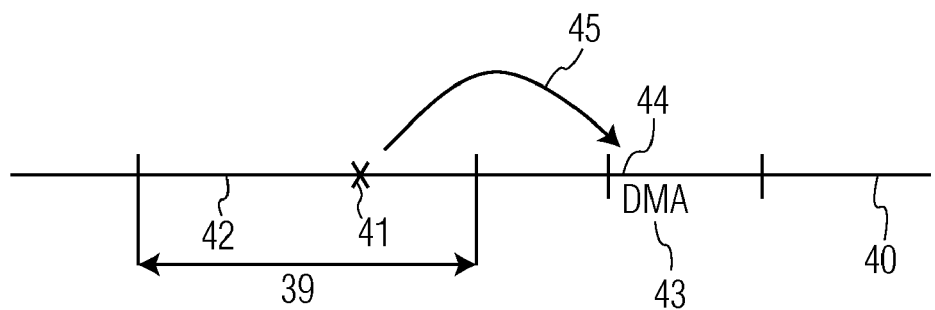

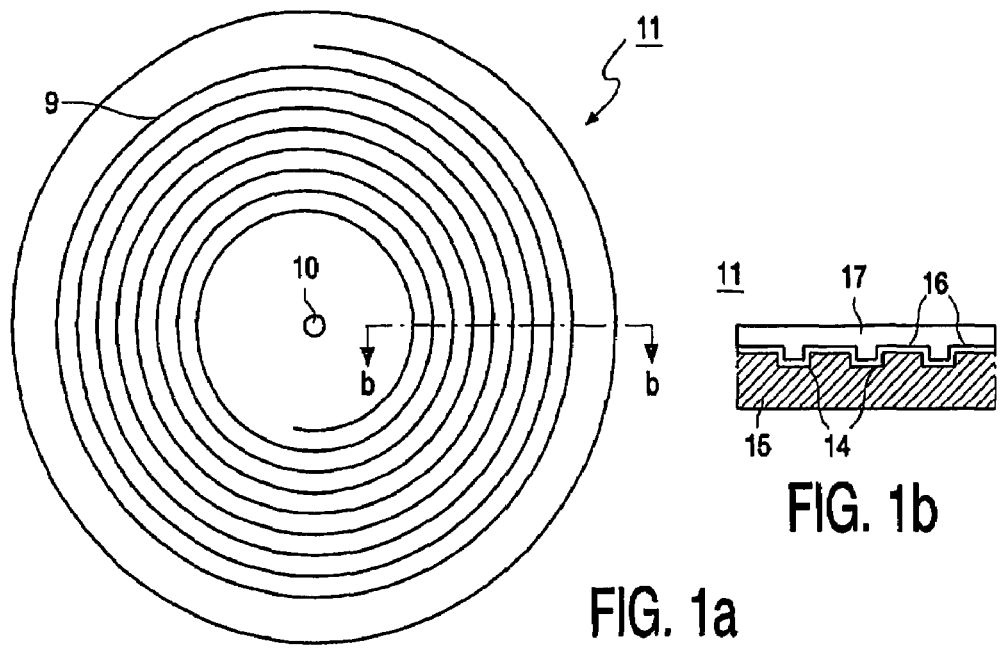
FIG. 1b
FIG. 1a
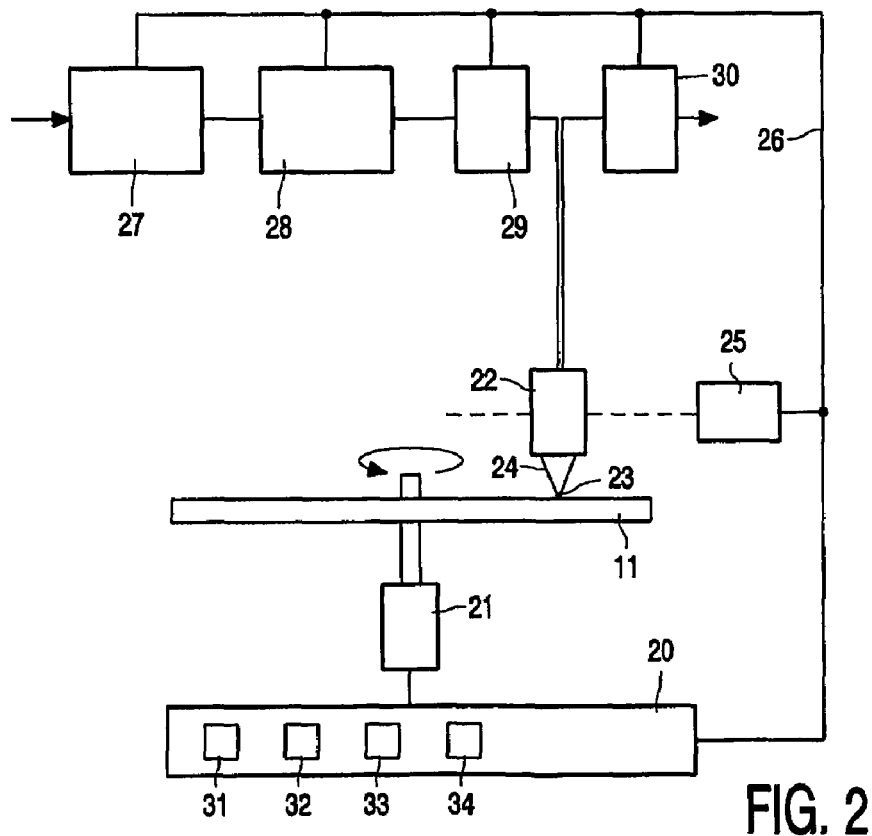
FIG. 2

DEVICE AND METHOD FOR RECORDING INFORMATION

The invention relates to a device for recording information in blocks having logical addresses on a record carrier.

The invention further relates to a method of recording information in blocks having logical addresses in a track on a record carrier.

The invention further relates to a computer program product for recording information.

The invention relates to the field of defect management in recording systems, and in particular to defect management when recording real-time information such as video.

A device and method for recording information on a record carrier are known from U.S. Pat. No. 5,956,309. The apparatus has recording means for recording the information in information blocks having logical addresses on an optical disc in a track at allocated physical addresses. The logical addresses constitute a contiguous storage space. In practice, the record carrier may exhibit defective parts of the track, in particular a defect preventing a block to be recorded at a specific physical address. These defects might be caused by scratches, dust, fingerprints and so on. Initially, before any user data is recorded, defects are detected, and physical addresses of defective sectors are removed from use in a defect table, a process usually called slipping. In the event of defects detected during use of the record carrier, logical addresses assigned to defective physical addresses are assigned to different physical addresses in a defect management area, a process usually called remapping or linear replacement. Remapping introduces a performance penalty as remapping introduces a movement of the recording head (for example an optical pickup unit, OPU), and possibly also a medium rotational speed adjustment and rotational delay(s). Hence defect management areas are located distributed over the total recording area to reduce jumping distances. A problem of the known system is that when a series of blocks is to be recorded that has a large continuous range of logical addresses, the corresponding range of physical addresses may extend over one or more defect management areas. Hence during recording and reproducing the continuous range of logical addresses the optical head has to jump across the defect management areas.

It is an object of the invention to provide a system for contiguously recording and reproducing a series of blocks of digital information, which provides defect management while reducing movements of the head.

For this purpose, the device as described in the opening paragraph comprises recording means for recording marks in a track on the record carrier representing the information, control means for controlling the recording by locating each block at a physical address in the track, physical addresses in first parts of the track being assigned to at least one user data area and physical addresses in second parts of the track being assigned to defect management areas, the control means comprising addressing means for translating the logical addresses into the physical addresses and vice versa in dependence of defect management information, defect management means for detecting defects and maintaining the defect management information in the defect management areas, the defect management information at least including remapping information indicative for translating a logical address initially mapped to a physical address exhibiting a defect to an alternate physical address in a defect management area, and contiguous recording means for recording a series of blocks having a continuous logical address range in a corresponding allocated physical address range, in particular digitally encoded video, for detecting if the allocated physical address range is interrupted by a subset of physical addresses assigned to a defect management area, for reallocating the subset of physical addresses to the user data area, and for contiguously recording the series of blocks extending over the subset of physical addresses.

For this purpose, the method as described in the opening paragraph is for recording information in blocks having logical addresses located at physical addresses in a track on a record carrier, the logical addresses corresponding to the physical addresses in dependence of defect management information, physical addresses in first parts of the track being assigned to at least one user data area and physical addresses in second parts of the track being assigned to defect management areas, defects being detected and the defect management information being maintained in the defect management areas, and the defect management information at least including remapping information indicative for translating a logical address initially mapped to a physical address exhibiting a defect to an alternate physical address in a defect management area, a series of blocks having a continuous logical address range, in particular digitally encoded video, corresponding to an allocated physical address range, the method comprising detecting if the allocated physical address range is interrupted by a subset of physical addresses assigned to a defect management area, reallocating the subset of physical addresses to the user data area, and contiguously recording the series of blocks extending over the subset of physical addresses.

The measures have the effect that defect management areas which would interrupt large files of recorded data, are dynamically moved to a different physical address range. This has the advantage that the large files are stored more contiguously and no jumps are required to skip defect management areas.

The invention is also based on the following recognition. Optical media in general have quite a reasonable data-rate, but the access performance (jumping over the disc) is rather limited. Hence for writing a file to the medium as fast as possible (and reading the same file later on) it is preferred to write (read) the file physically contiguous to the medium. An application accessing the record carrier via a usual (host) interface can only influence logical addresses of the medium to which blocks of the file should be written. In order to get a large file as fast as possible to a medium the application may assign a large continuous logical address space. In the recording device (drive) the continuous logical address space is mapped on the physical address space of the medium. In general this mapping is rather straight forward (e.g. something like a 1-to-1 mapping), but defects and defect management areas will interrupt the allocated physical address range. Defects necessarily have to be accommodated by the defect management system. The inventors have seen that for such contiguous recording the defect management areas itself can be removed from the allocated physical address range, obviating the need to jump across defect management areas.

In an embodiment of the device the contiguous recording means are for reallocating said interrupting defect management area to different physical addresses and updating the defect management information correspondingly. The interrupting defect management area is moved to a new location, e.g. shifted forward to the end of the contiguously recorded file or to the end of the medium. This has the advantage that the total available defect management areas are not changed, and the file system accessing the medium via the recording device does not need to be informed of any changed data.

In an embodiment of the device the contiguous recording means are for at least partly removing said interrupting defect management area from the defect management areas. This has the advantage that more storage space becomes available for recording user data. For example the defect management system may initially assign a relatively large amount of physical addresses to defect management areas to accommodate a worst case medium, while during use the medium proves to have only average or less then average defects.

Further embodiments are given in the dependent claims.

Figure 8:
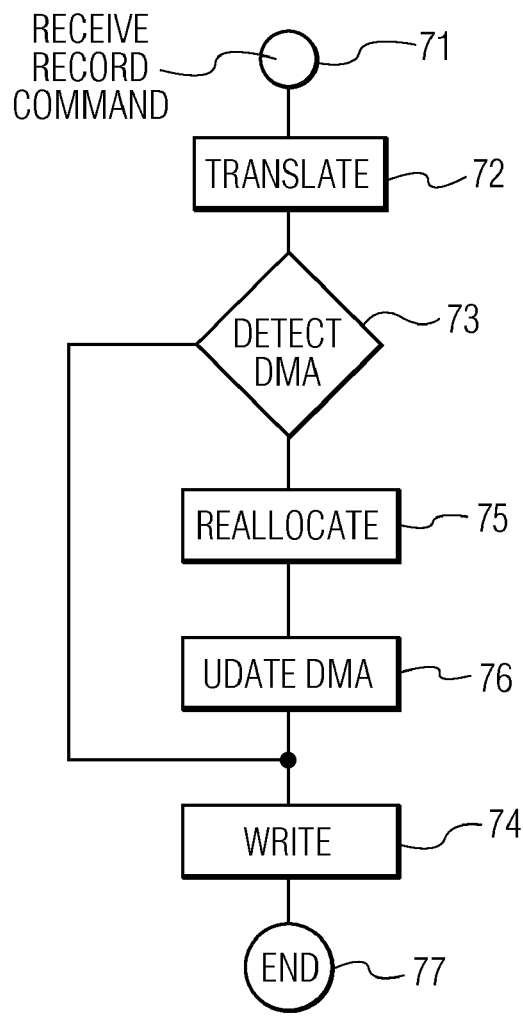
Figure 4:
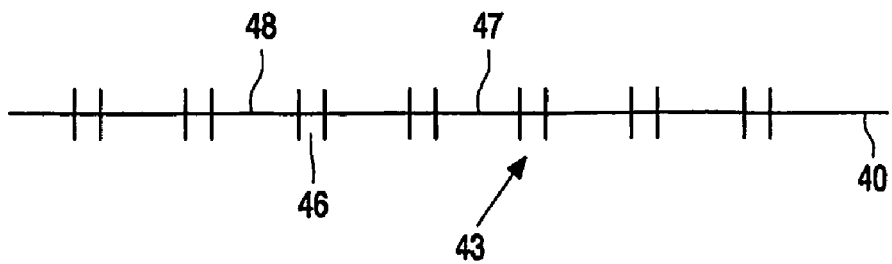
Figure 5:
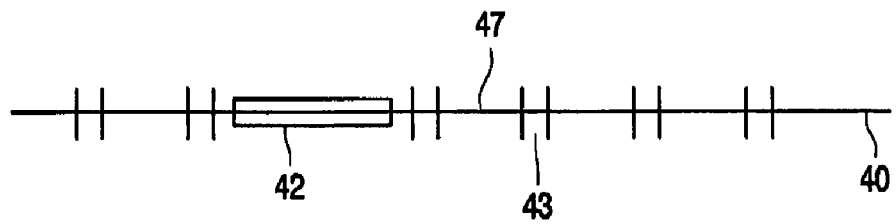
Figure 6:
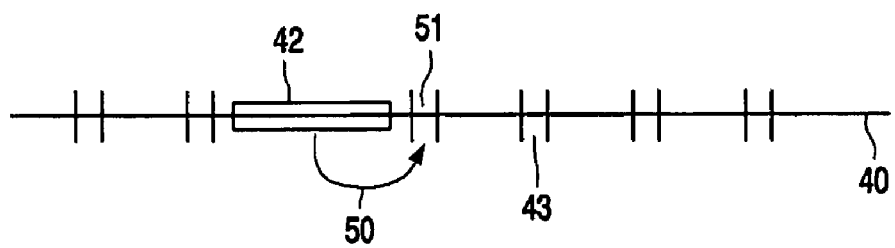
Figure 7:
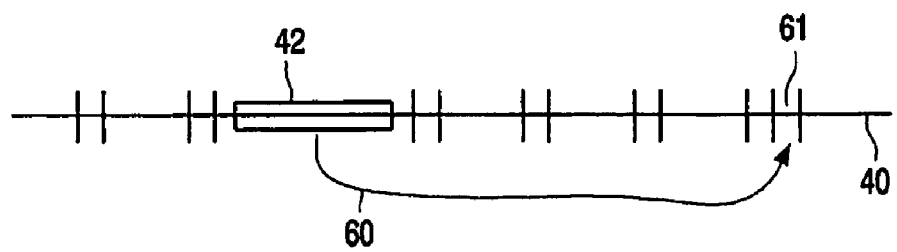

These and other aspects of the invention will be apparent from and elucidated further with reference to the embodiments described by way of example in the following description and with reference to the accompanying drawings, in which FIG. 1a shows a record carrier (top view), FIG. 1b shows a record carrier (cross section), FIG. 2 shows a recording device, FIG. 3 shows remapping of defective locations, FIG. 4 shows distributed defect management areas, FIG. 5 shows contiguous recording, FIG. 6 shows shifting a defect management area, FIG. 7 shows shifting a defect management area to the end of the medium, and FIG. 8 shows a method of dynamically moving defect management areas.

Corresponding elements in different Figures have identical reference numerals.

FIG. 1a shows a disc-shaped record carrier 11 having a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc, and has an information layer of a recordable type. Examples of a recordable disc are the CD-R and CD-RW, and writable versions of DVD, such as DVD+RW, and the high density writable optical disc using blue lasers, called Blu-ray Disc (BD). Further details about the DVD disc can be found in reference: *ECMA-267: 120 mm DVD—Read-Only Disc—* (1997). The information is represented on the information layer by recording optically detectable marks along the track, e.g. crystalline or amorphous marks in phase change material. The track 9 on the recordable type of record carrier is indicated by a pre-embossed track structure provided during manufacture of the blank record carrier. The track structure is constituted, for example, by a pregroove 14 which enables a read/write head to follow the track during scanning. The track structure comprises position information including so-called physical addresses, for indicating the location of units of information, usually called information blocks. The position information includes specific synchronizing marks for locating the start of such information blocks.

FIG. 1b is a cross-section taken along the line b-b of the record carrier 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The pregroove 14 may be implemented as an indentation or an elevation of the substrate 15 material, or as a material property deviating from its surroundings.

The record carrier 11 is intended for carrying digital information in blocks under control of a file management system, the information including real-time information to be recorded and reproduced continuously, in particular information representing digitally encoded video according to a standardized format like MPEG2.

FIG. 2 shows a recording device for writing information on a record carrier 11 of a type which is writable or re-writable, for example CD-R or CD-RW, or DVD+RW or BD. The device is provided with recording means for scanning the track on the record carrier which means include a drive unit 21 for rotating the record carrier 11, a head 22, a positioning unit 25 for coarsely positioning the head 22 in the radial direction on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning the spot 23 in a radial direction on the center of the track. The tracking actuator may comprise coils for radially moving an optical element or may alternatively be arranged for changing the angle of a reflecting element. For writing information the radiation is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. For reading the radiation reflected by the information layer is detected by a detector of a usual type, e.g. a four-quadrant diode, in the head 22 for generating a read signal and further detector signals including a tracking error and a focusing error signal for controlling said tracking and focusing actuators. The read signal is processed by read processing unit 30 of a usual type including a demodulator, deformatter and output unit to retrieve the information. Hence retrieving means for reading information include the drive unit 21, the head 22, the positioning unit 25 and the read processing unit 30. The device comprises write processing means for processing the input information to generate a write signal to drive the head 22, which means comprise an input unit 27, and modulator means comprising a formatter 28 and a modulator 29. During the writing operation, marks representing the information are formed on the record carrier. The marks are formed by means of the spot 23 generated on the recording layer via the beam 24 of electromagnetic radiation, usually from a laser diode. Writing and reading of information for recording on optical disks and formatting, error correcting and channel coding rules are well-known in the art, e.g. from the CD and DVD system.

The control unit 20 is connected via control lines 26, e.g. a system bus, to said input unit 27, formatter 28 and modulator 29, to the read processing unit 30, and to the drive unit 21, and the positioning unit 25. The control unit 20 comprises control circuitry, for example a microprocessor, a program memory and control gates, for performing the procedures and functions according to the invention as described below. The control unit 20 may also be implemented as a state machine in logic circuits. The control unit 20 controls the recording and retrieving of information and may be arranged for receiving commands from a user or from a host computer.

The input unit 27 processes the audio and/or video to units of information, which are passed to the formatter 28 for adding control data and formatting the data as information blocks according to a predefined recording format, e.g. by adding error correction codes (ECC) and/or interleaving. For computer applications units of information may be interfaced to the formatter 28 directly. The formatted data from the output of the formatter 28 is passed to the modulation unit 29, which comprises for example a channel coder, for generating a modulated signal which drives the head 22. Further the modulation unit 29 comprises synchronizing means for including synchronizing patterns in the modulated signal. The formatted units presented to the input of the modulation unit 29 comprise address information and are written to corresponding addressable locations on the record carrier under the control of control unit 20, and for performing defect management as described below.

In an embodiment the input unit 27 is arranged for receiving real-time information. The input unit may comprise compression means for input signals such as analog audio and/or video, or digital uncompressed audio/video. Suitable compression means are described for audio in WO 98/16014-A1 (PHN 16452), and for video in the MPEG2 standard. The input signal may alternatively be already digitally encoded.

The control unit 20 is arranged for controlling the recording by locating each block at a physical address in the track, and includes the following cooperating units: an addressing unit 31, a defect management unit 32, a contiguous recording unit 33, and (optionally) a memory 34.

The addressing unit 31 is for translating physical addresses into logical addresses and vice versa in dependence of defect management information. The logical addresses constitute a contiguous storage space to be used for storing files of information blocks under control of a file management system, for example UDF. The defect management unit 32 detects defects, for example by monitoring the signal quality of a read-out signal from the head 22 during recording and/or reading. The defects may also be detected by determining an error rate in retrieved information blocks. The defect management unit further maintains the defect management information in defect management areas on the record carrier, for example in defect lists as defined for the DVD recordable systems like DVD+RW. The defect management information at least includes remapping information.

In an embodiment the recording device is arranged as a drive unit to be connected to a separate host system, for example a drive unit to be build in a PC. The control unit 20 is arranged to communicate with a processing unit in the host system via a standardized interface. Alternatively the recording drive is arranged as a stand alone unit, for example a video recording apparatus for consumer use. The control unit 20, or an additional host control unit included in the device, is arranged to be controlled directly by the user, and to also perform the functions of the file management system.

FIG. 3 shows remapping of defective locations. A physical address space 40 is schematically represented by a horizontal line. A series of blocks 42 is to be recorded in an allocated physical address range 39. However a defect 41 interrupts the allocated physical address range. Remapping 45 is the process that a block 44 having a logical address corresponding to the physical address 41 that is defective is stored in an alternative physical address in a defect management spare area (DMA) 43. The remapping information provides data for translating the logical address initially mapped to a physical address exhibiting a defect to an alternate physical address in a defect management area, for example an entry in a secondary defect list including the logical address of the remapped block and its corresponding physical address. Alternatively remapping information may include data for translation of a physical address of a defect to a different physical address in a defect management area.

The contiguous recording unit 33 in FIG. 2 performs the following functions. First it is detected that a series of blocks having a continuous logical address range is to be recorded in a corresponding allocated physical address range. In general contiguous recording is required for real-time information which has a relative high data rate, in particular video information. The type of data may be included in the writing commands received by the control unit, for example a write command from a host computer including a real-time bit. The detection of contiguous recording may also be based on the amount of data blocks indicated in a write command, or by other aspects such as the fact that new blocks having logical addresses consecutive to the last written block arrive at regular intervals.

FIG. 4 shows distributed defect management areas. A physical address space 40 is schematically represented by a horizontal line. First parts of the physical address space are assigned to defect management areas (DMA) 43,46 and second parts of the physical address space are assigned to user data areas 47,48, i.e. are assigned to logical addresses available for storing user data. An example is the Mount Rainier defect management as defined for CD-MRW. A description of Mount Rainier and CD-MRW is available from Philips on http://www.licensing.philips.com/information/mtr/. In the logical space of the medium the DMAs are not visible. This means that if a large file is written to disc even if the entire file has continuous logical addresses, there will be DMAs included in the physical address allocated to the file. These DMAs in the middle of such a data file harm the performance of writing and consequent reading back of the file, as there are a number of jumps introduced when the entire file is written (retrieved) due to the jumping over the DMAs. The solution is to move the interrupting DMA to different physical addresses. As a result the large files are contiguous not only logically, but also physically on the medium.

FIG. 5 shows contiguous recording. The physical address space is as shown in FIG. 4. A series of blocks 42 constituting (part of) a large file is recorded starting in the user data area 48. However the series of blocks extends over the defect management area 46. The defect management area 46 covers a subset of physical addresses, which defect management area is removed from the defect management areas. The subset of physical addresses originally assigned to the removed defect management area 46 are reallocated to user data area, and used for continuing the recording of the series of blocks 42.

FIG. 6 shows shifting a defect management area. The physical address space and contiguously recorded data are as shown in FIG. 5. The interrupting defect management area 46 has been shifted to a new location 51, as indicated by arrow 50. The new location 51 is constituted by physical address before the next defect management area. Hence the translation of logical addresses to physical addresses is unaffected after the next defect management area.

FIG. 7 shows shifting a defect management area to the end of the medium. The physical address space and contiguously recorded data are as shown in FIG. 5. The interrupting defect management area 46 has been shifted to a new location 61, as indicated by arrow 60. The new location 61 is constituted by physical address at the end of the medium, for example the last part of the last user data area. Effectively, when during the writing of a large file a DMA is reached, this DMA is shifted forward towards the end of the medium. The translation of logical addresses to physical addresses has to be adapted accordingly.

For relocating or removing a DMA it is required that any blocks already remapped and stored in that DMA are moved to a new location. When the DMA is still empty there is no problem and only the information about the location of this DMA needs to be updated. For example a pointer to the removed DMA has to be updated, or the status or size indicator for that DMA is changed to indicate that no space is available or space is available at a new physical address. If the location of the DMAs is not stored as a pointer somewhere on disc, but hard linked to a certain format, the location of the DMAs can't be changed. The solution is then to disable a certain DMA completely by making all entries in that particular DMA unusable. In most practical defect management systems the location of the DMAs is stored as a pointer somewhere on disc. For example for CD-MRW pointers and sizes of DMAs are stored in the MTA (Main Table Area), which consists of a MIP (Main Information Packet) and a MDT (Main Defect Table). The location pointer and possibly the size of the DMA have to be updated.

In an embodiment the device is provided with a memory 34, for example a cache coupled to the control unit 20. When the DMA that is to be removed is not empty (for example there are already replacements made to that DMA) there are inter alia the following three options.

(1) Keep the data that has to be written to the location of the interrupting DMA for the time being in the cache. This data is written to disc at a later stage, e.g. in a background process active when no new real time data has to be recorded.
(2) Read the data blocks of the interrupting DMA in cache and continue to write the new data (also extending over the 'old' DMA location). Of course the data of the DMA has to be written to disc after the write action is finished.
(3) Use a piece of empty disc to store the amount of real-time data equal to the DMA size temporarily somewhere else. After the real-time operation is finished put the information that was at the DMA location at a new location, and finally retrieve the amount of data equal to the DMA from its temporary location and store it at the correct location. In an embodiment for drives that have no File System knowledge the temporary location could be an empty part of another DMA. Alternatively, if File System knowledge is available in the device, a free area could be (temporarily) allocated via the file system.

In an embodiment in either of the above options the device first detects which of the physical addresses in the DMA actually contain defect management information and need to be remapped. Temporarily storing and/or postponement of writing are applied only for the physical addresses that actually contain defect management data.

It is noted that the first option requires additional cache memory; the second option also requires additional cache memory and one small additional jump (over the size of a DMA); the third option doesn't need additional cache memory to store data in for a longer period of time, but does introduce two larger jumps (to and back from the free location). However, writing in any of these situations will typically not take any longer than it would have taken when the invention is not applied. The advantage of each of the options can be found in the increased performance when the large file is read back again. As reading a file is typically performed more often than writing that same file, the invention has a clear performance advantage.

In an embodiment the defect management system is adapted. If there are defects in the physical address range that is allocated to the contiguous series of blocks, the writing of the series is interrupted at the defect but continued immediately after the defect, effectively skipping the defective physical addresses. Logical addresses are assigned continuously by 'slipping' the defect. At the end of the file, the file doesn't fit in the allocated physical address range anymore (due to the 'slipped' defective addresses). The remainder of the file should be written at a free location on the medium. Preferably this is directly after the allocated physical address range, but it can be at any other free area at the cost of one extra access. In an embodiment physical addresses containing defects detected interrupting the allocated physical address range are marked as being unusable, e.g. defect or already taken. In fact the defects may, at least partly, take the required space from the originally removed DMA. Hence no additional space is used from the user data area. Of course any previously remapped blocks in the removed DMA still need to be accommodated as described above. Another solution could be to apply 'slipping' as described above and to get the extra-required space from the next DMA. This means that all data between the assigned area for the file and the next DMA has to be shifted over a distance corresponding to the number of defects that is in the allocated physical address range.

In an embodiment the process of avoiding having a DMA interrupting a large contiguous data file is performed after writing of the large file in the normal way has been finished. The drive could then start shifting data over the medium, thereby generating the result as described above wherein interrupting DMAs are removed. It is noted that this may lead to moving a lot of data over the medium, i.e. copying blocks from the original physical address to a new physical address. An advantage is that the drive could do the contiguous recording process in the background, which prevents a user being disturbed by the process.

FIG. 8 shows a method of dynamically moving defect management areas. The method controls the recording of the blocks by locating each block at a physical address in a track on a record carrier. Physical addresses in first parts of the track are assigned to at least one user data area and physical addresses in second parts of the track are assigned to defect management areas as shown in FIG. 4. In a first step 71 'RECEIVE' a command is received to record a series of blocks having continuous logical addresses, in particular digitally encoded video. In a step 'TRANSLATE' 72 the logical addresses are translated into corresponding physical addresses. For the translation defect management information is retrieved from the record carrier, for example primary defect lists indicating slipped defects as described above. It is noted that the defect management information includes remapping information indicative for translating a logical address initially mapped to a physical address exhibiting a defect to an alternate physical address in a defect management area. The process of detecting defects and maintaining the defect management information in the defect management areas is not shown separately in the figure. In a step 'DETECT DMA' 73 it is detected if the allocated physical address range is interrupted by a subset of physical addresses assigned to a defect management area. If not, the writing of the series is performed in step 'WRITE' 74, and the process complete at 'END' 77. However, if an interrupting DMA is detected in step 'DETECT DMA' 73, the DMA is removed by reallocating the subset of physical addresses assigned to the DMA to the user data area in step 'REALLOCATE' 75. In a step 'UPDATE DM' 76 the defect management information is adapted to the removal of the interrupting DMA. Finally in step 'WRITE' 74 the series of blocks is contiguously recorded extending over the subset of physical addresses now reallocated to user data area. It is noted that various options for accommodating the defect management information originally assigned to the removed DMA are described with the device options above.

Although the invention has been explained mainly by embodiments using a CD-RW defect management system, similar defect management systems used for DVD and BD are suitable for applying movement of DMAs when recording large data files. Also for the information carrier an optical disc has been described, but other media, such as a magnetic hard disc, can be used. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. A device for recording information in blocks having logical addresses on a record carrier, which device comprises
   recording means for recording marks in a track on the record carrier representing the information,
   control means for controlling the recording by locating each block at a physical address in the track, physical addresses in first parts of the track being assigned to at least one user data area and physical addresses in second parts of the track being assigned to defect management areas, the control means comprising
   addressing means for translating the logical addresses into the physical addresses and vice versa in dependence of defect management information,
   defect management means for detecting defects and maintaining the defect management information in the defect management areas, the defect management information at least including remapping information indicative for translating a logical address initially mapped to a physical address exhibiting a defect to an alternate physical address in a defect management area, and
   contiguous recording means
   for recording a series of blocks having a continuous logical address range in a corresponding allocated physical address range,
   for detecting if the allocated physical address range is interrupted by a subset of physical addresses previously assigned to a defect management area,
   for reallocating the subset of physical addresses previously assigned to the defect management area, to the user data area, and
   for contiguously recording the series of blocks extending over the subset of physical addresses previously assigned to the defect management area.

2. The device as claimed in claim 1, wherein the contiguous recording means are for reallocating said interrupting defect management area to different physical addresses and updating the defect management information correspondingly.

3. The device as claimed in claim 1, wherein the contiguous recording means are for detecting blocks previously remapped to the subset of physical addresses, and, in the event of detecting previously remapped blocks, for remapping the previously remapped blocks.

4. The device as claimed in claim 3, wherein the device comprises a memory and the contiguous recording means are for, during contiguous recording,
   storing in the memory blocks from the series of blocks corresponding to the previously remapped blocks until after said remapping, or
   reading the previously remapped blocks into the memory and continue recording the series of blocks extending over the subset, or
   reading the previously remapped blocks, writing them on a free area of the disc and continue recording the series of blocks extending over the subset.

5. The device as claimed in claim 1, wherein the contiguous recording means are for at least partly removing said interrupting defect management area from the defect management areas.

6. The device as claimed in claim 5, wherein the contiguous recording means are for adapting defect management status information indicating that the interrupting defect management area is unusable or adapting pointer information or size information indicating the location or size of the interrupting defect management area.

7. The device as claimed in claim 1, wherein the contiguous recording means are for detecting a defect physical address interrupting the allocated physical address range, and creating a defect management area extending over the defect by reassigning the defect physical address to the defect management areas.

8. The device as claimed in claim 1, wherein the contiguous recording means are for contiguously recording a previously recorded series of blocks, in a background process.

9. A method of recording information in blocks having logical addresses located at physical addresses in a track on a record carrier,
   the logical addresses corresponding to the physical addresses in dependence of detect management information,
   physical addresses in first parts of the track being assigned to at least one user data area and physical addresses in second parts of the track being assigned to defect management areas,
   defects being detected and the defect management information being maintained in the defect management areas, and
   the defect management information at least including remapping information indicative for translating a logical address initially mapped to a physical address exhibiting a defect to an alternate physical address in a defect management area,
   a series of blocks having a continuous logical address range, corresponding to an allocated physical address range, the method comprising acts of
   detecting if the allocated physical address range is interrupted by a subset of physical addresses previously assigned to a defect management area,
   reallocating the subset of physical addresses previously assigned to the defect management area, to the user data area, and
   contiguously recording the series of blocks extending over the subset of physical addresses previously assigned to the defect management area.

10. A computer program stored on a computer readable memory medium for recording information in blocks having logical addresses located at physical addresses in a track on a record carrier, the logical addresses corresponding to the physical addresses in dependence of defect management information, physical addresses in first parts of the track being assigned to at least one user data area and physical addresses in second parts of the track being assigned to defect management areas, defects being detected and the defect management information being maintained in the defect management areas, and the defect management information at least including remapping information indicative for translating a logical address initially mapped to a physical address exhibiting a defect to an alternate physical address in a defect management area, a series of blocks having a continuous logical address range, corresponding to an allocated physical address range, which program is operative to cause a processor to:

detect if the allocated physical address range is interrupted by a subset of physical addresses previously assigned to a defect management area, reallocate the subset of physical addresses previously assigned to the defect management area, to the user data area, and contiguously recording the series of blocks extending over the subset of physical addresses previously assigned to the defect management area, to the user data area.

* * * * *